(12) United States Patent
Ding et al.

(10) Patent No.: US 10,832,685 B2
(45) Date of Patent: Nov. 10, 2020

(54) SPEECH PROCESSING DEVICE, SPEECH PROCESSING METHOD, AND COMPUTER PROGRAM PRODUCT

(71) Applicant: Kabushiki Kaisha Toshiba, Minato-ku (JP)

(72) Inventors: Ning Ding, Yokohama (JP); Makoto Hirohata, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 237 days.

(21) Appl. No.: 15/253,982

(22) Filed: Sep. 1, 2016

(65) Prior Publication Data

US 2017/0076727 A1    Mar. 16, 2017

(30) Foreign Application Priority Data

Sep. 15, 2015    (JP) .................................. 2015-182325

(51) Int. Cl.
| | | |
|---|---|---|
| *G10L 17/00* | (2013.01) | |
| *G10L 17/02* | (2013.01) | |
| *G10L 17/04* | (2013.01) | |
| *G10L 17/08* | (2013.01) | |

(52) U.S. Cl.
CPC .............. *G10L 17/08* (2013.01); *G10L 17/00* (2013.01); *G10L 17/02* (2013.01); *G10L 17/04* (2013.01)

(58) Field of Classification Search
None
See application file for complete search history.

(56) References Cited

U.S. PATENT DOCUMENTS

| | | | |
|---|---|---|---|
| 7,539,617 B2 | 5/2009 | Mami et al. | |
| 7,620,547 B2 | 11/2009 | Kompe et al. | |
| 7,769,588 B2 | 8/2010 | Kompe et al. | |
| 8,630,860 B1 * | 1/2014 | Zhang ..................... | G10L 15/26 704/275 |

(Continued)

FOREIGN PATENT DOCUMENTS

| | | |
|---|---|---|
| JP | 2000-181489 | 6/2000 |
| JP | 2005-534065 | 11/2005 |

(Continued)

OTHER PUBLICATIONS

Lie Lu, Hong-Jiang Zhang, Speaker Change Detection and Tracking in Real-Time News Broadcasting Analysis, 2002, Pages: all URL: https://paginas.fe.up.pt/~ee98235/Files/Speaker%20change%20detection%20%20and%20tracking%20in%20real-time%20news%20broadcasting%20analysis.pdf.*

(Continued)

*Primary Examiner* — Richa Mishra
(74) *Attorney, Agent, or Firm* — Oblon, McClelland, Maier & Neustadt, L.L.P.

(57) ABSTRACT

According to an embodiment, a speech processing device includes an extractor, a classifier, a similarity calculator, and an identifier. The extractor is configured to extract a speech feature from utterance data. The classifier is configured to classify the utterance data into a set of utterances for each speaker based on the extracted speech feature. The similarity calculator is configured to calculate a similarity between the speech feature of the utterance data included in the set and each of a plurality of speaker models. The identifier is configured to identify a speaker for each set based on the calculated similarity.

9 Claims, 12 Drawing Sheets

(56) References Cited

U.S. PATENT DOCUMENTS

| | | | |
|---|---|---|---|
| 2009/0106025 A1 | 4/2009 | Toyama | |
| 2009/0248412 A1 | 10/2009 | Washio | |
| 2010/0169093 A1* | 7/2010 | Washio | G10L 15/063 704/243 |
| 2015/0348571 A1* | 12/2015 | Koshinaka | G10L 25/60 704/245 |

FOREIGN PATENT DOCUMENTS

| | | |
|---|---|---|
| JP | 2007-514959 | 6/2007 |
| JP | 2009-025411 | 2/2009 |
| JP | 2009-237353 | 10/2009 |
| JP | 2010-032792 | 2/2010 |
| JP | 2010-54733 | 3/2010 |
| JP | 2010-286702 | 12/2010 |
| JP | 4854732 | 1/2012 |
| JP | 2012-118251 | 6/2012 |
| WO | WO 2007/111169 A1 | 10/2007 |

OTHER PUBLICATIONS

Lie Lu, Hong-Jiang Zhang, Speaker Change Detection and Tracking in Real-Time News Broadcasting Analysis, 2002, Pages: all URL: https://paginas.fe.up.pt/~ee98235/Files/Speaker%20change%20detection%20and%20tracking%20in%20real-time%20news%20broadcasting%20analysis.pdf (Year: 2002).*

Douglas A. Reynolds, et al., "Speaker Verification Using Adapted Gaussian Mixture Models", Digital Signal Processing, vol. 10, 2000, 23 pgs.

Najim Dehak, et al., "Front-End Factor Analysis for Speaker Verification", IEEE Transactions on Audio, Speech, and Language Processing, vol. 19, (4), 2011, 11 pgs.

* cited by examiner

$$D(c_1, m_A) = \frac{D(u_1, m_A) * \alpha_1 + D(u_8, m_A) * \alpha_8}{\alpha_1 + \alpha_8} = \frac{0.8*1 + 0.7*0.5}{1+0.5} = 0.77$$

SPEECH PROCESSING DEVICE, SPEECH PROCESSING METHOD, AND COMPUTER PROGRAM PRODUCT

CROSS-REFERENCE TO RELATED APPLICATION

This application is based upon and claims the benefit of priority from Japanese Patent Application No. 2015-182325, filed on Sep. 15, 2015; the entire contents of which are incorporated herein by reference.

FIELD

Embodiments described herein relate generally to a speech processing device, a speech processing method, and a computer program product.

BACKGROUND

In the related art, known is a technique for learning a speaker model of a speaker using utterance data of the speaker, and identifying an utterance of a corresponding speaker using the learned speaker model.

In the related art, utterances of the same speaker need to be prepared, and it is difficult to determine the number of speakers for utterance data of a plurality of speakers, and to determine the utterance data of the same speaker.

DETAILED DESCRIPTION

According to an embodiment, a speech processing device includes an extractor, a classifier, a similarity calculator, and an identifier. The extractor is configured to extract a speech feature from utterance data. The classifier is configured to classify the utterance data into a set of utterances for each speaker based on the extracted speech feature. The similarity calculator is configured to calculate a similarity between the speech feature of the utterance data included in the set and each of a plurality of speaker models. The identifier is configured to identify a speaker for each set based on the calculated similarity.

First Embodiment

Figure 1:
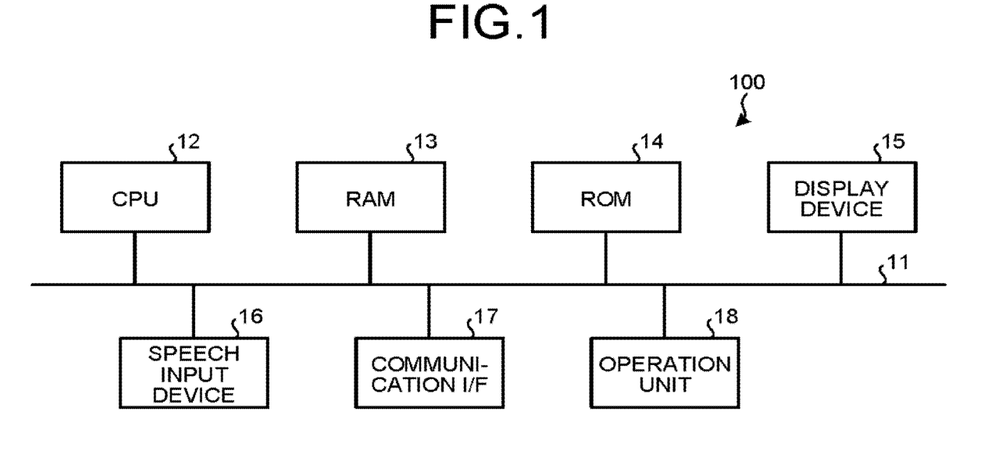
FIG. 1 is a diagram illustrating a hardware configuration of a speech processing device according to first embodiment.

FIG. 1 is a diagram illustrating an example of a hardware configuration of a speech processing device 100 according to a first embodiment. As illustrated in FIG. 1, the speech processing device 100 includes a central processing unit (CPU) 12, a random access memory (RAM) 13, a read only memory (ROM) 14, a display device 15, a speech input device 16, a communication I/F 17, and an operation unit 18. Pieces of hardware are connected to each other via a system bus 11. For example, the speech processing device 100 is an information processing device such as a personal computer (PC), a tablet terminal, and a server device.

The CPU 12 controls the entire operation of the speech processing device 100. The CPU 12 executes a computer program stored in the ROM 14 and the like using the RAM 13 as a working area to control the entire operation of the speech processing device 100. The RAM 13 temporarily stores information and the like related to various pieces of processing, and is used as the working area for executing the computer program stored in the ROM 14 and the like. The ROM 14 stores the computer program for implementing processing performed by the speech processing device 100. The display device 15 displays a processing result, a state, and the like obtained by the speech processing device 100. For example, the display device 15 is a liquid crystal display or a touch panel. The speech input device 16 is a microphone and the like for inputting a speech and the like. The communication I/F 17 is an interface that controls communication with an external apparatus. The operation unit 18 is an interface for operating the speech processing device 100. For example, the operation unit 18 is a keyboard or a mouse. When the speech processing device 100 includes a touch panel, the display device 15 and the operation unit 18 may be integrated with each other as an operation display unit. To implement the present embodiment, the speech processing device 100 may include at least the CPU 12, the RAM 13, the ROM 14, and the display device 15.

Figure 2:
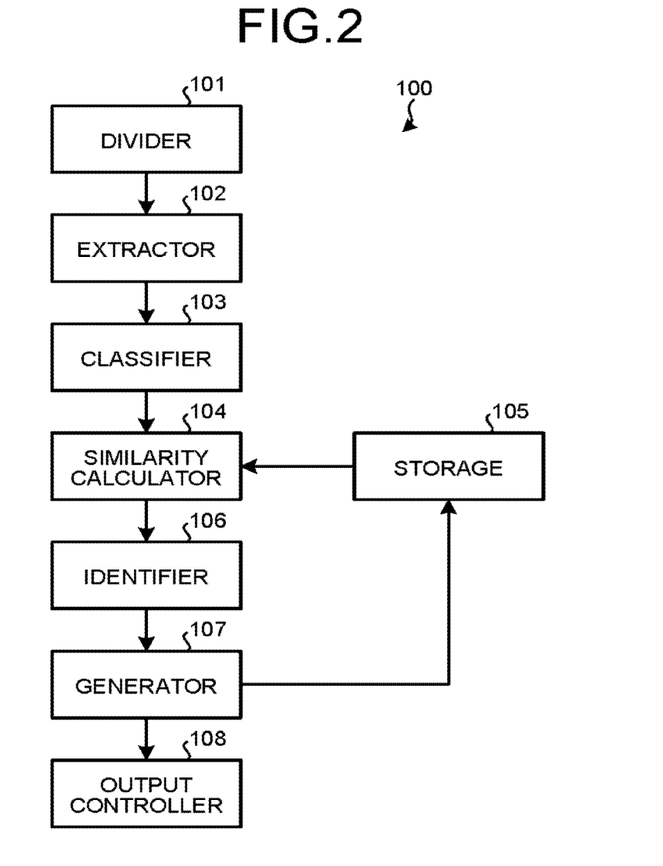
FIG. 2 is a block diagram illustrating a functional configuration of the speech processing device according to the first embodiment.

FIG. 2 is a block diagram illustrating an example of a functional configuration of the speech processing device 100 according to the first embodiment. As illustrated in FIG. 2, the speech processing device 100 includes a divider 101, an extractor 102, a classifier 103, a similarity calculator 104, a storage 105, an identifier 106, a generator 107, and an output controller 108. Part or all of the above components other than the storage 105 may be implemented as software (computer program) or hardware. The speech processing device 100 classifies and identifies utterances of a plurality of speakers mixed in data based on an input of data such as speech data obtained by using the speech input device 16 and a speech file generated in advance, learns a speaker model, and outputs a processing result.

The divider 101 divides the speech data. More specifically, when the input speech data is longer than a predetermined time, the divider 101 divides the speech data. A time length of utterance is preferably shorter than the divided speech data. According to one aspect, the speech data may be divided for each fixed time. That is, the divider 101 performs processing to divide the speech data corresponding to a certain long time. In other words, when the speech data input to the speech processing device 100 is divided into a plurality of pieces of speech data in advance, the divider 101 does not perform the processing.

The extractor 102 extracts a speech feature from utterance data. More specifically, the extractor 102 extracts a feature of the utterance from the speech data including the utterance of the speaker divided by the divider 101 using a Mel-frequency cepstrum coefficient (MFCC), a linear predictive coding (LEC) cepstrum, and the like.

The classifier 103 classifies the utterance data into a set of utterances for each speaker based on the extracted speech feature. In the present embodiment, the set of utterances for each speaker is called a "cluster". As a method of classification, hierarchical classification and the like may be used. More specifically, the classifier 103 integrates a pair of pieces of data the speech features of which are closer to each other as one cluster from among a plurality of pieces of utterance data, the speech features being extracted by the extractor 102. The classifier 103 searches for a pair of pieces of data the speech features of which are closer to each other from among a generated cluster and the other pieces of utterance data to classify the data into each of clusters of utterance data for each of a plurality of speakers. When a distance between the speech features of pieces of data is within a predetermined distance, the clusters are integrated as one cluster.

Figure 3:
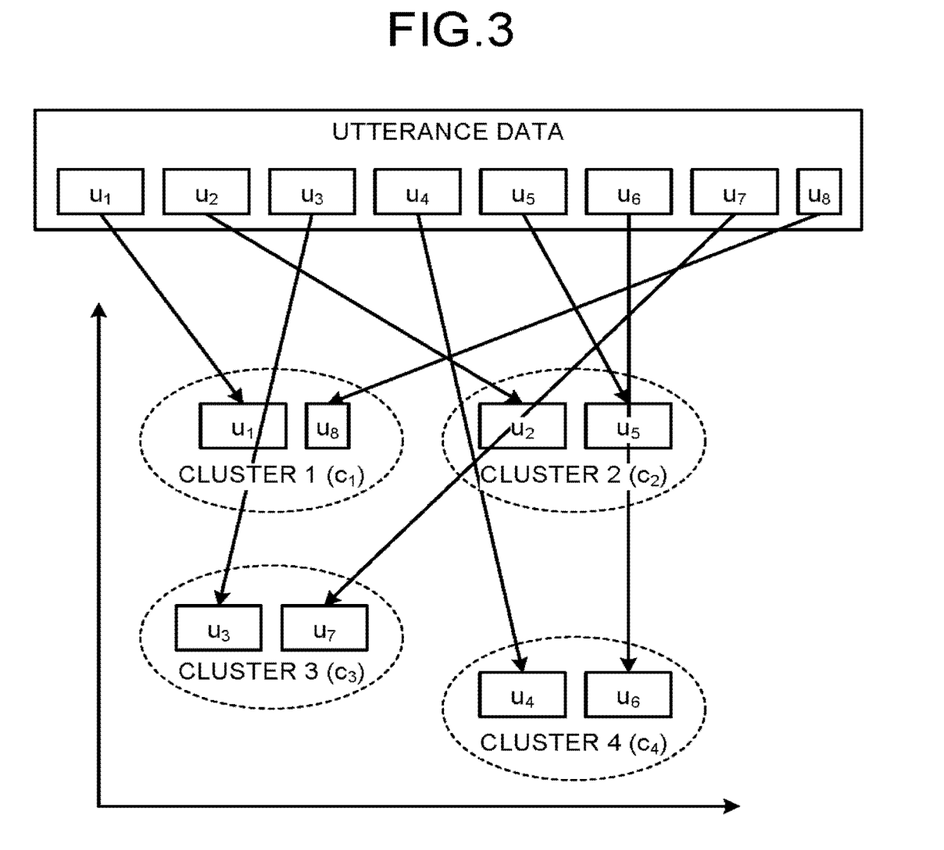
FIG. 3 is a diagram for explaining a method of classifying utterance data according to the first embodiment.

FIG. 3 is a diagram for explaining an example of a method of classifying the utterance data according to the first embodiment. As illustrated in FIG. 3, exemplified is a case of classifying eight pieces of data, that is, $u_1$, $u_2$, $u_3$, $u_4$, $u_5$, $u_6$, $u_7$, and $u_8$ as the utterance data. The classifier 103 classifies the utterance data $u_1$ and the utterance data $u_8$ into a cluster 1 ($c_1$) based on the distance between the speech features of the utterance data $u_1$ and the other pieces of utterance data. The classifier 103 checks the distance between the speech features of the cluster 1 ($c_1$) and the other pieces of utterance data. If there is a piece of utterance data to be integrated, the classifier 103 integrates the piece of utterance data into the cluster ($c_1$). In the example in FIG. 3, the cluster 1 ($c_1$) is obtained by integrating the utterance data $u_1$ with the utterance data $u_8$. Subsequently, the classifier 103 classifies the utterance data $u_2$ and the utterance data $u_5$ into a cluster 2 ($c_2$) based on the distance between the speech features of the utterance data $u_2$ and the other pieces of utterance data. The classifier 103 then checks the distance between the speech features of the cluster 2 ($c_2$) and the other pieces of utterance data. If there is a piece of utterance data to be integrated, the classifier 103 integrates the piece of utterance data into the cluster 2 ($c_2$). In the example in FIG. 3, the cluster 2 ($c_2$) is obtained by integrating the utterance data $u_2$ with the utterance data $u_5$. By repeatedly performing these pieces of processing, as illustrated in FIG. 3, the utterance data is classified into a plurality of clusters.

Returning to FIG. 2, the similarity calculator 104 calculates a similarity between the speech feature of the utterance data included in the set and each of a plurality of speaker models. More specifically, the similarity calculator 104 calculates the similarity between the speech features of a plurality of pieces of utterance data included in the cluster classified by the classifier 103 and the speaker models stored in the storage 105. The storage 105 stores a plurality of speaker models. The similarity calculator 104 calculates the similarity between the speech features of a plurality of pieces of utterance data included in each cluster and each speaker model. However, the storage 105 does not store all speaker models corresponding to all the speakers. As described later, according to the present embodiment, accuracy of the speaker model that has been already stored is improved by learning, and an utterance of an unknown speaker is added as a speaker model of a new speaker. For example, the speaker model may be represented by a Gaussian mixture model (GMM), or represented by an i-vector. In the present embodiment, a likelihood of the speech feature with respect to the speaker model is utilized as the similarity between the speech feature and the speaker model. For example, regarding the GMM, refer to "Douglas A, Reynolds et al, "Speaker Verification Using Adapted Gaussian Mixture Models", Digital Signal Processing, Vol. 10, 2000, p. 19-41." Regarding the i-vector, refer to "Najim Dehak et al, "Front-End Factor Analysis for Speaker Verification", IEEE Trans on audio, speech, and language processing, vol. 19, No. 4, 2011, pp. 788-798", for example.

Figure 4:
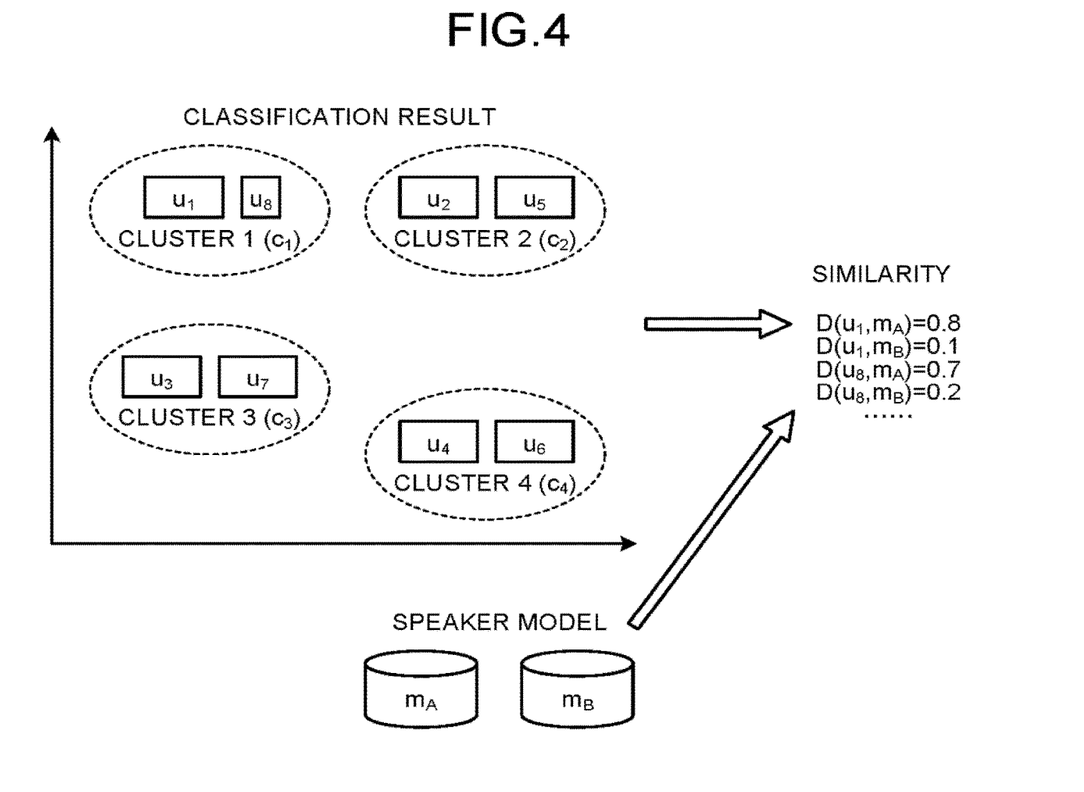
FIG. 4 is a diagram for explaining similarity calculation according to the first embodiment.

FIG. 4 is a diagram for explaining an example of similarity calculation according to the first embodiment. A classification result illustrated in FIG. 4 is a result obtained by performing classification described with reference to FIG. 3. In this state, it is assumed that the storage 105 stores two speaker models, that is, a speaker model $m_A$ and a speaker model $m_B$. For example, as illustrated in FIG. 4, the similarity calculator 104 calculates the similarity "$D(u_1, m_A)=0.8$" between the utterance data $u_1$ in the cluster 1 ($c_1$) and the speaker model $m_A$. The similarity calculator 104 also calculates the similarity "$D(u_1, m_B)=0.1$" between the utterance data $u_1$ in the cluster 1 ($c_1$) and the speaker model $m_B$. The similarity calculator 104 also calculates the similarity "$D(u_8, m_A)=0.7$" between the utterance data $u_8$ in the cluster 1 ($c_1$) and the speaker model $m_A$. The similarity calculator 104 calculates the similarity "$D(u_8, m_B)=0.2$" between the utterance data $u_8$ in the cluster 1 ($c_1$) and the speaker model $m_B$. In this way, the similarity calculator 104 calculates the similarity between each piece of utterance data included in the cluster 2 ($c_2$) and each speaker model, the similarity between each piece of utterance data included in a cluster 3 ($c_3$) and each speaker model, and the similarity between each piece of utterance data included in a cluster 4 ($c_4$) and each speaker model.

Returning to FIG. 2, the identifier 106 identifies the speaker for each set based on the calculated similarity. More specifically, the identifier 106 weights similarities between the speaker model and all pieces of utterance data classified into the same cluster, and obtains the sum thereof. For example, weighting is performed such that a smaller weight is given to an utterance in a shorter time. That is, regarding the utterance in a short time, the feature thereof largely varies because of fluctuation due to the short time, and reliability of the similarity tends to be low, so that the weight is caused to be smaller. For example, weighting is performed such that a smaller weight is given to an utterance having lower accuracy of classification. That is, there is a possibility that an error is caused in the classification performed by the classifier 103, and utterances of different speakers are mixed in the same cluster, so that a smaller weight is given to an utterance having lower similarity. The identifier 106 identifies the speaker in the cluster having a weighted sum of the similarities equal to or larger than a predetermined threshold as the speaker corresponding to the speaker model. When there are a plurality of clusters having the weighted sum of the similarities equal to or larger than the predetermined threshold, the cluster having the highest similarity may be identified as the speaker corresponding to the speaker model.

Figure 5:
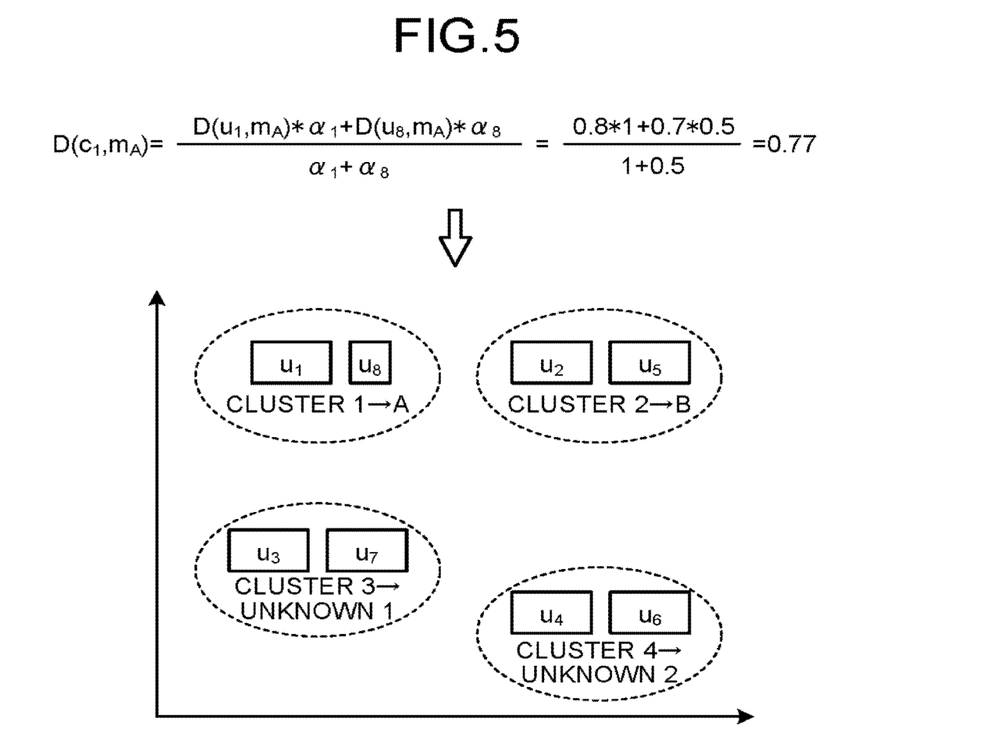
FIG. 5 is a diagram for explaining identification of a speaker in a cluster according to the first embodiment.

FIG. 5 is a diagram for explaining an example of identifying the speaker in the cluster according to the first embodiment. For example, as illustrated in FIG. 5, the identifier 106 obtains the weighted sum "$D(c_1, m_A)=0.77$" of the similarities between the cluster 1 ($c_1$) and the speaker model $m_A$. In the example illustrated in FIG. 5, a weight $\alpha_1$ of the similarity between the utterance data $u_1$ and the speaker model $m_A$ is "1", and a weight $\alpha_8$ of the similarity between the utterance data $u_8$ and the speaker model $m_A$ is "0.5". When the obtained weighted sum "$D(c_1, m_A)=0.77$" is equal to or larger than a predetermined threshold (for example, 0.5), the identifier 106 identifies the speaker in the cluster 1 ($c_1$) as a speaker A corresponding to the speaker model $m_A$. The identifier 106 performs the same processing on the clusters 2 to 4. Accordingly, the cluster 2 ($c_2$) is identified as a speaker B, the cluster 3 ($c_3$) is identified as an unknown speaker, and the cluster 4 ($c_4$) is identified as an unknown speaker. In this case, although the speaker in the cluster 3 ($c_3$) and the speaker in the cluster 4 ($c_4$) are both the unknown speakers, they are classified into the different clusters, so that they are identified as different unknown speakers (unknown 1, unknown 2).

Returning to FIG. 2, the generator 107 generates the speaker model assuming that the speaker in the set having the weighted sum of the similarities that is smaller than the predetermined threshold is a new speaker. More specifically, in identifying the speaker by the identifier 106, the generator 107 assumes that each cluster of an unknown speaker having the weighted sum of the similarities that is smaller than the predetermined threshold is not present in the speaker models stored in the storage 105, and causes each cluster to be generated as a new speaker model Using the speech features of a plurality of utterances in the cluster. The generator 107 stores the generated new speaker model in the storage 105. As a learning method of the speaker model, a learning method using the GMM or a learning method using the i-vector may be used.

Figure 6:
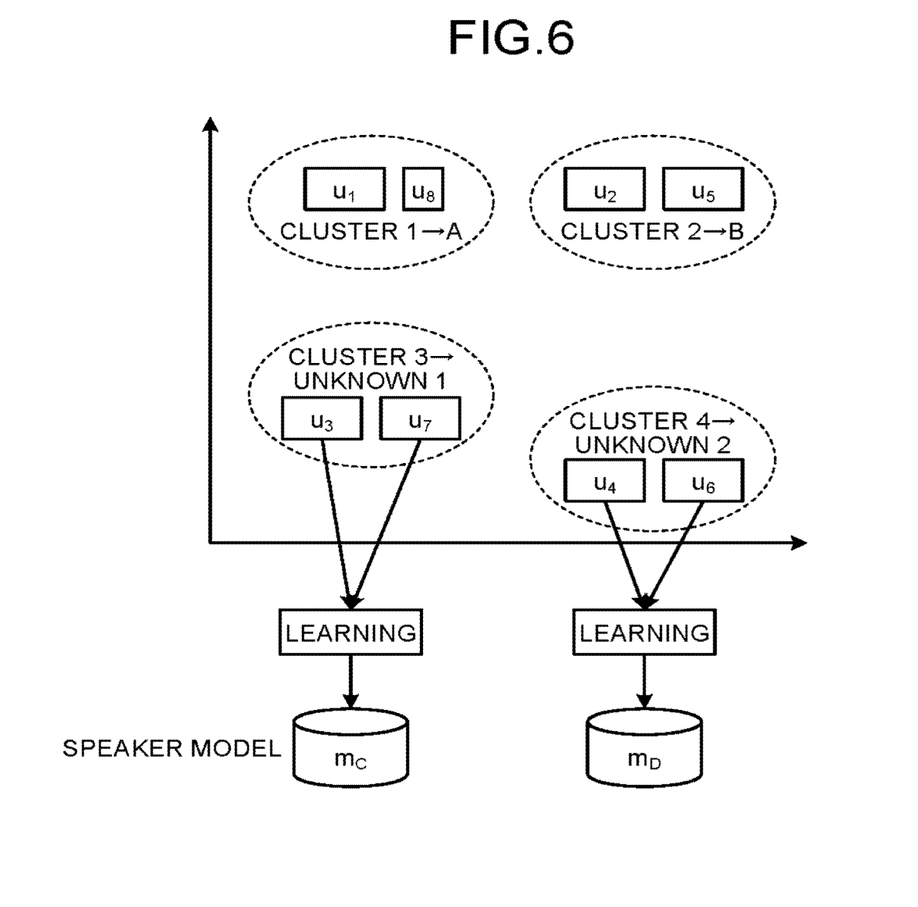
FIG. 6 is a diagram for explaining learning of a speaker model according to the first embodiment.

FIG. 6 is a diagram for explaining an example of learning the speaker model according to the first embodiment. For example, as illustrated in FIG. 6, when the cluster 3 ($c_3$) does not correspond to any of the speaker models (speaker model $m_A$, speaker model $m_B$) that have been already stored in the storage 105, the generator 107 generates a speaker model $m_C$ as one of unknown speakers because the weighted sum of the similarities is smaller than the predetermined threshold. The generator 107 then stores the generated speaker model $m_C$ in the storage 105 as a new speaker model. Similarly, for the cluster 4 ($c_4$) as unknown 2, the generator 107 stores a speaker model $m_D$ in the storage 105 as a new speaker model. In this way, the generator 107 learns the speaker model.

In this case, the threshold used by the identifier 106 and the generator 107 is not limited to the above usage example. In the above description, the identifier 106 identifies the speaker in the cluster having the weighted sum of the similarities equal to or larger than the predetermined threshold as the speaker corresponding to the speaker model, and the generator 107 generates the speaker model assuming that the speaker in the cluster having the weighted sum of the similarities that is smaller than the predetermined threshold is a new speaker. Alternatively, the identifier 106 may identify the speaker in the cluster having the weighted sum of the similarities equal to or larger than a first threshold as the speaker corresponding to the speaker model, and the generator 107 may generate the speaker model assuming that the speaker in the cluster having the weighted sum of the similarities that is smaller than a second threshold, which is smaller than the first threshold, is a new speaker. For example, the first threshold is assumed to be larger than the predetermined threshold, and the second threshold is assumed to be smaller than the predetermined threshold. Accordingly, in the former case, the speaker (including an unknown speaker) can be identified for all the clusters. In the latter case, the threshold (first threshold) that is high to some extent is used for identifying the speaker model, and the threshold (second threshold) that is low to some extent is used for a generation condition of a new speaker model, so that the speaker can be identified with higher accuracy.

Returning to FIG. 2, the output controller 108 controls an output of an identification result of the speaker. For example, the output controller 108 performs control for outputting, to the display device 15, a name and the like of the speaker identified by the identifier 106 and a storage place and the like of corresponding speech data. For example, in accordance with an operation for reproducing the speech data, the output controller 108 performs control for reproducing the speech data of a designated speaker.

Figure 7:
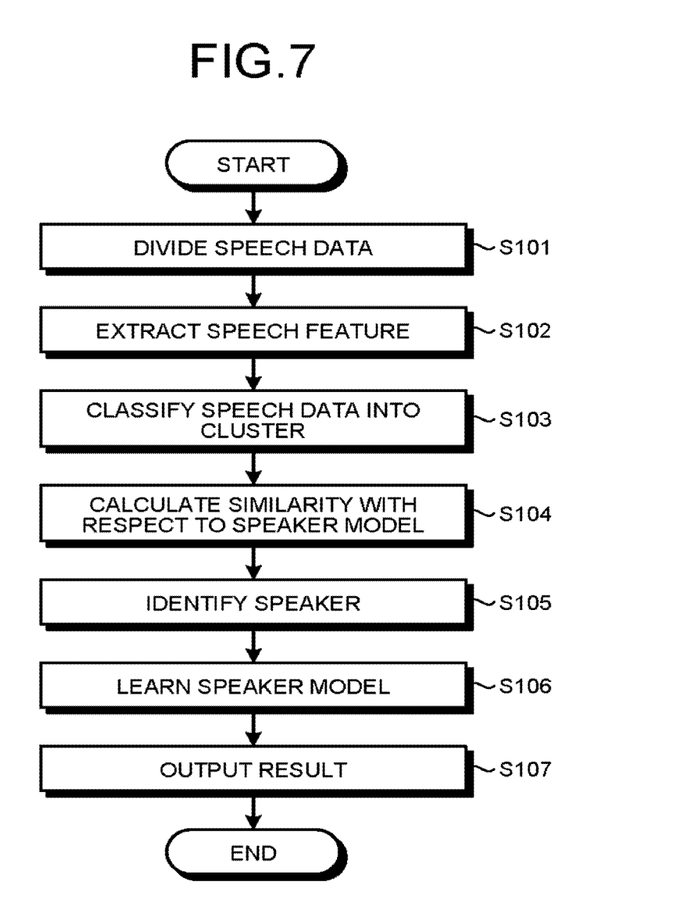
FIG. 7 is a flowchart illustrating a processing procedure performed by the speech processing device according to the first embodiment.

FIG. 7 is a flowchart illustrating an example of a processing procedure performed by the speech processing device 100 according to the first embodiment. As illustrated in FIG. 7, the speech processing device 100 divides the input speech data for each fixed time, for example (Step S101). The speech processing device 100 then extracts the speech feature of the utterance included in each of divided pieces of speech data (Step S102). Subsequently, the speech processing device 100 classifies the utterance included in the divided piece of speech data into the cluster based on the extracted speech feature (Step S103). Thereafter, the speech processing device 100 calculates the similarities between the speech features of a plurality of utterances included in the cluster and the speaker model stored in the storage 105 (Step S104).

The speech processing device 100 then weights the similarities between all the utterances classified into the same cluster and the speaker model, obtains the sum thereof, and identifies the speaker in the cluster having the weighted sum of the similarities equal to or larger than the predetermined threshold as the speaker corresponding to the speaker model (Step S105). Subsequently, the speech processing device 100 assumes that each unknown cluster having the weighted sum of the similarities that is smaller than the predetermined threshold is not present in the speaker models stored in the storage 105, generates a new speaker model using the speech features of a plurality of utterances in the cluster, and stores the generated new speaker model in the storage 105 to learn the speaker model (Step S106). Thereafter, the speech processing device 100 causes the identification result of the speaker to be output and displayed on the display device 15 and the like (Step S107).

According to the present embodiment, the speech feature of the utterance data is extracted, a plurality of pieces of utterance data are classified into the clusters of utterances of different speakers based on the extracted speech feature, the similarity between the speech feature of the utterance included in the cluster and each of a plurality of speaker models, and the speaker is identified for each cluster based on the calculated weighted sum of the similarities, so that the utterances of the same speaker can be identified from among a plurality of pieces of utterance data of a plurality of speakers.

According to the present embodiment, when the cluster cannot be identified as the speaker corresponding to the speaker model, the cluster is identified as a cluster for a new speaker not present in the speaker models, so that a plurality of new speaker models can be learned.

Second Embodiment

Figure 8:
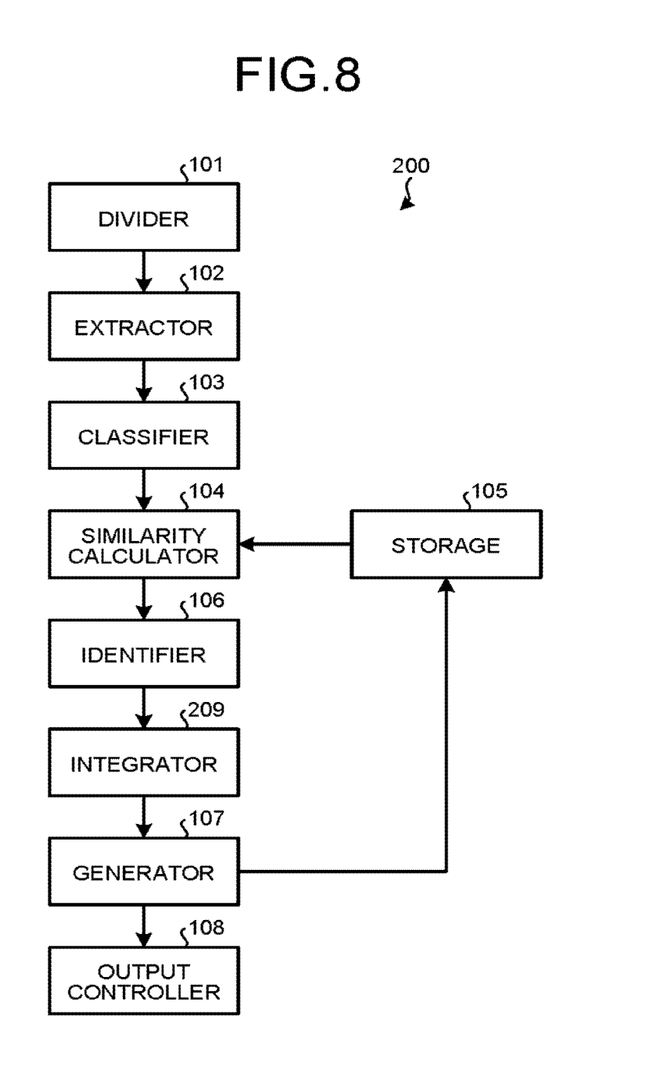
FIG. 8 is a block diagram illustrating a functional configuration of a speech processing device according to a second embodiment.

FIG. 8 is a block diagram illustrating an example of a functional configuration of a speech processing device 200 according to a second embodiment. In the second embodiment, the same configuration as the functional configuration of the speech processing device 100 according to the first embodiment is denoted by the same reference numeral, and detailed description thereof will not be repeated in some cases. Specifically, functions of components other than an integrator 209 (described below) are the same as the functions of the components according to the first embodiment. A hardware configuration of the speech processing device 200 according to the second embodiment is the same as the hardware configuration of the speech processing device 100 according to the first embodiment.

As illustrated in FIG. 8, the speech processing device 200 includes the divider 101, the extractor 102, the classifier 103, the similarity calculator 104, the storage 105, the identifier 106, the generator 107, the output controller 108, and the integrator 209. Part or all of the components other than the storage 105 may be implemented as are (computer program) or hardware.

The integrator 209 integrates sets each having the same identified speaker. More specifically, when the identifier 106 identifies the speaker corresponding to each cluster, the integrator 209 integrates clusters identified as the same speakers into one cluster. Accordingly, the generator 107 generates the speaker model based on the cluster integrated by the integrator 209.

The following describes processing performed by the speech processing device 200 according to the second embodiment with reference to FIGS. 9 to 12. Except the processing of integrating the clusters identified as the same speakers into one cluster, the processing is the same as the processing performed by the speech processing device 100 according to the first embodiment, so that detailed description of the processing is not provided.

Figure 9:
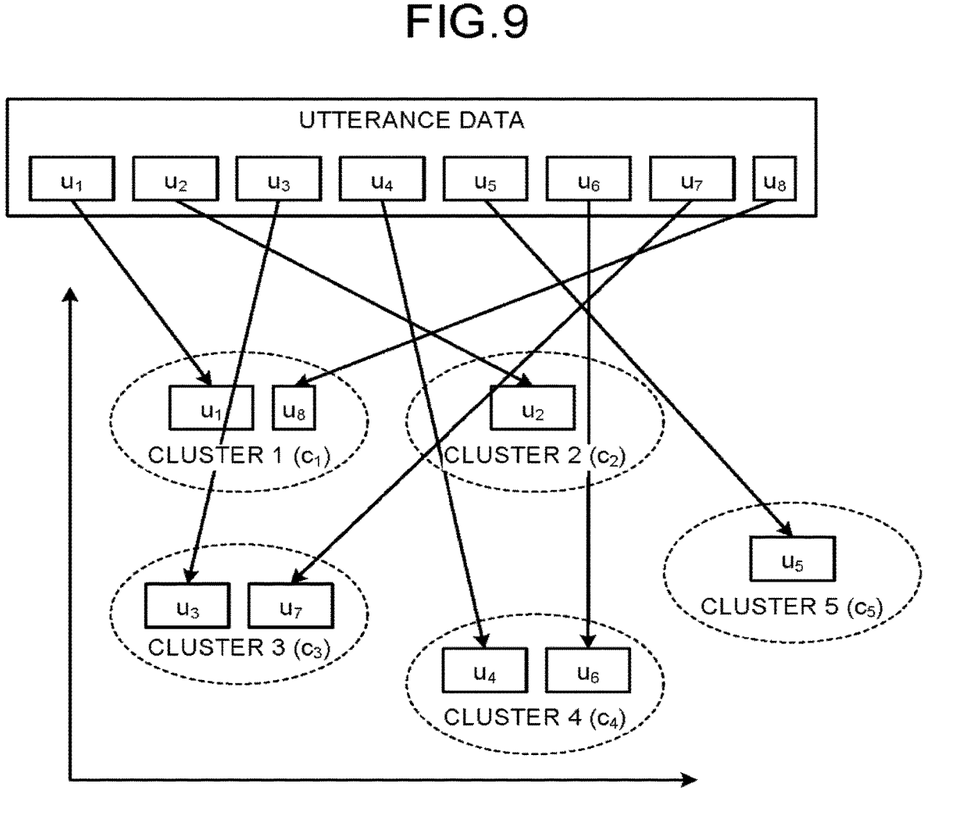
FIG. 9 is a diagram for explaining classification of utterance data according to the second embodiment.

FIG. 9 is a diagram for explaining an example of classifying the utterance data according to the second embodiment. For example, as illustrated in FIG. 9, it is assumed that the classifier 103 classifies the utterance data $u_2$ and the utterance data $u_5$, which are actually different utterances of the same speaker, into the cluster 2 ($c_2$) and a cluster 5 ($c_5$). The utterance data $u_2$ and the utterance data $u_5$ are assumed to be utterance data of the speaker B corresponding to the speaker model $m_B$.

Figure 10:
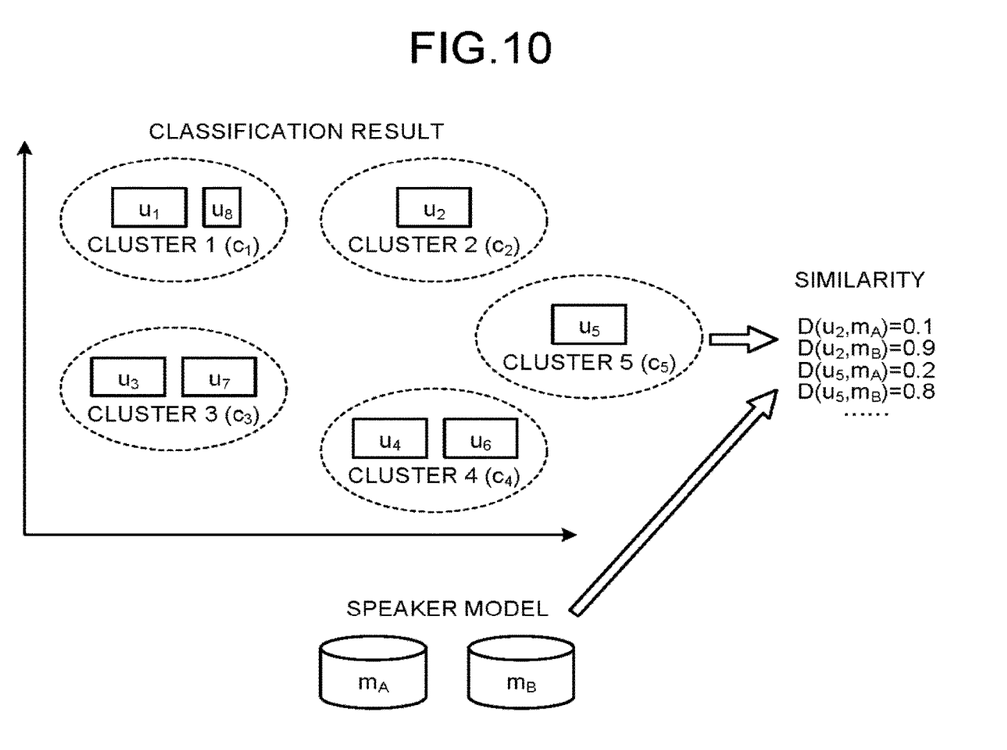
FIG. 10 is a diagram for explaining similarity calculation according to the second embodiment.

FIG. 10 is a diagram for explaining an example of similarity calculation according to the second embodiment. For example, as illustrated in FIG. 10, the similarity calculator 104 calculates the similarity "$D(u_2, m_B)=0.9$" between the utterance data in the cluster 2 ($c_2$) and the speaker model $m_B$. The similarity calculator 104 also calculates the similarity "$D(u_5, m_B)=0.8$" between the utterance data $u_5$ in the cluster 5 ($c_5$) and the speaker model $m_B$.

Figure 11:
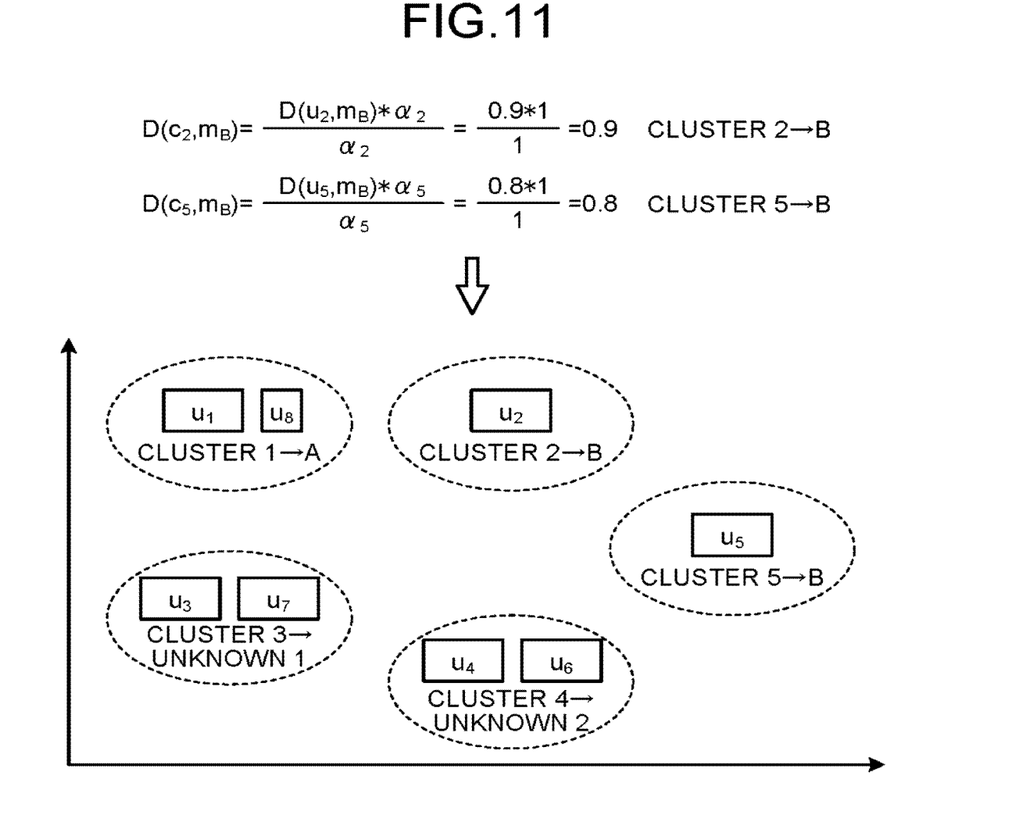
FIG. 11 is a diagram for explaining identification of a speaker in a cluster according to the second embodiment.

FIG. 11 is a diagram for explaining an example of identifying the speaker in the cluster according to the second embodiment. For example, as illustrated in FIG. 11, the identifier 106 obtains the weighted sum "$D(c_2, m_B)=0.9$" of the similarities between the cluster ($c_2$) and the speaker model $m_B$. In the example illustrated in FIG. 11, a weight $\alpha_2$ of the similarity between the utterance data $u_2$ and the speaker model $m_B$ is "1". The obtained weighted sum is equal to or larger than the predetermined threshold, so that the identifier 106 identifies the speaker in the cluster ($c_2$) as the speaker B corresponding to the speaker model $m_B$. Similarly, the identifier 106 obtains the weighted sum "$D(c_5, m_B)=0.8$" of similarity between the cluster 5 ($c_5$) and the speaker model $m_B$. In the example illustrated in FIG. 11, a weight $\alpha_5$ of the similarity between the utterance data $u_5$ and the speaker model $m_B$ is "1". The obtained weighted sum is equal to or larger than the predetermined threshold, so that the identifier 106 identifies the speaker in the cluster 5 ($c_5$) as the speaker B corresponding to the speaker model $m_B$. That is, the same speaker is identified for the cluster 2 and the cluster 5.

Figure 12:
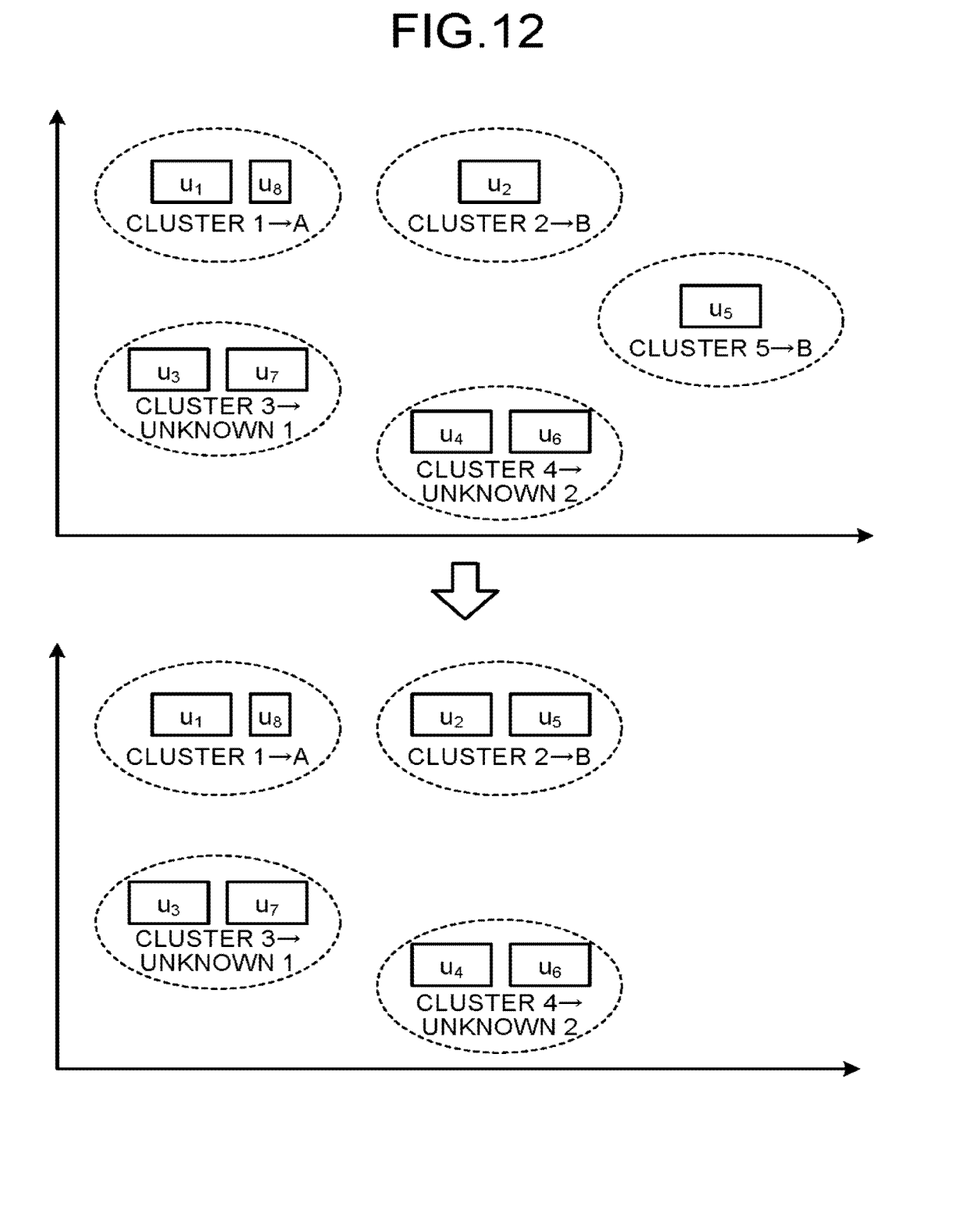
FIG. 12 is a diagram for explaining integration of clusters according to the second embodiment.

FIG. 12 is a diagram for explaining an example of integrating the clusters according to the second embodiment. For example, as illustrated in an upper part of FIG. 12, it is assumed that the cluster 2 and the cluster 5 are identified as the same speaker (speaker B) by the identifier 106. In this case, as illustrated in a lower part of FIG. 12, the integrator 209 integrates, into one cluster, the cluster 2 and the cluster 5 that are identified as the same speaker by the identifier 106. FIG. 12 exemplifies a case of integrating the cluster 2 and the cluster 5 into one cluster 2.

Figure 13:
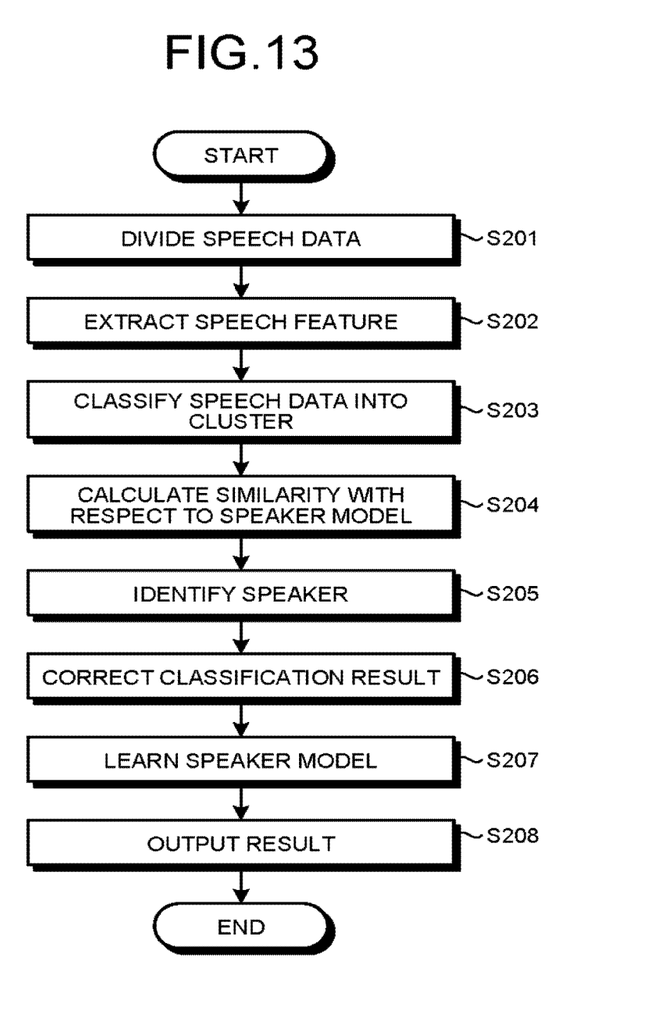
FIG. 13 is a flowchart illustrating a processing procedure performed by the speech processing device according to the second embodiment.

FIG. 13 is a flowchart illustrating an example of a processing procedure performed by the speech processing device 200 according to the second embodiment. Processing at Steps S201 to S205 illustrated in FIG. 13 is the same as the processing at Steps S101 to S105 illustrated in FIG. 7, so that the description thereof will not be repeated. Processing at Steps S207 and S208 illustrated in FIG. 13 is the same as the processing at Steps S106 and 3107 illustrated in FIG. 7, so that the description thereof will not be repeated.

As illustrated in FIG. 13, when there are clusters each having the same identified speaker, the speech processing device 200 integrates the clusters and corrects the classification result of the clusters (Step S206). Thereafter, the speech processing device 200 learns the speaker model and outputs a processing result based on the integrated cluster obtained by correcting the classification result of the clusters.

According to the present embodiment, different clusters identified as the same speaker are integrated, so that the utterance of the speaker can be identified with higher accuracy, and a plurality of new speaker models can be learned with higher accuracy.

The processing procedure, the control procedure, the specific name, and the information including various pieces of data or parameters that are described above and illustrated in the drawings can be optionally changed unless specifically noted otherwise. The components of the devices illustrated in the drawings are merely conceptual, and it is not necessarily required that it is physically configured as illustrated. That is, specific forms of distribution or integration of the devices are not limited to those illustrated in the drawings. All or part thereof may be functionally physically distributed or integrated in arbitrary units depending on various loads or usage states.

The speech processing device 100 and the speech processing device 200 according to the above embodiments can be implemented, for example, using a general-purpose computer device as basic hardware. A computer program to be executed has a module configuration including the functions described above. The computer program to be executed may be recorded and provided in a computer-readable recording medium, which may be provided as a computer program product, such as a compact disc read only memory (CD-ROM), a compact disc recordable (CD-R), and a digital versatile disc (DVD), as an installable or executable file, or may be embedded and provided in a ROM, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech processing device comprising:
   a memory:
   a processor electrically coupled to the memory, and configured to function as an extractor, a classifier, a similarity calculator, and an identifier, wherein
   the extractor extracts a speech feature from utterance data;
   the classifier classifies the utterance data into a set of utterances for each speaker based on the extracted speech feature;
   the similarity calculator calculates a similarity between the speech feature of the utterance data included in the set and each of a plurality of speaker models; and
   the identifier identifies a speaker for each set based on the calculated similarity, wherein
   the identifier (1) identifies the speaker in the set having a weighted sum of the similarities equal to or larger than a first threshold as a known speaker corresponding to one of the speaker models, and (2) the identifier identifies the speaker in the set having a weighted sum of the similarities smaller than a second threshold, the second threshold being less than the first threshold, as a new speaker, and
   the processor is configured to further function as a generator, and the generator generates a new speaker model in the set having the weighted sum of the similarities that is smaller than the second threshold for the identified new speaker,
   wherein the classifier classifies the utterance data into clusters based on similarity of the utterance data, and the identifier obtains a weighted sum of similarity between each cluster and each speaker model, and when the weighted sum exceeds the first threshold, the respective cluster is identified as the known speaker for a corresponding speaker model, and when multiple clusters are identified as a same known speaker, the multiple clusters are integrated for the same known speaker.

2. The device according to claim 1, wherein the classifier repeatedly performs processing of causing a pair of pieces of utterance data having speech features closer to each other to be one set, and classifying, into the set, the other pieces of utterance data having a speech feature closer to the speech feature of the utterance data in the set.

3. The device according to claim 1, wherein the identifier gives a smaller weight of the similarity to an utterance in a shorter time.

4. The device according to claim 1, wherein the identifier gives a smaller weight of the similarity to an utterance having lower accuracy of classification.

5. The device according to claim 1, wherein the processor is configured to further function as an integrator, and the integrator integrates sets each having the same identified speaker.

6. The device according to claim 1, wherein the processor is configured to further function as an output controller, and the output controller controls an output of an identification result of the speaker.

7. A speech processing method comprising:
   extracting a speech feature from utterance data;
   classifying the utterance data into a set of utterances for each speaker based on the extracted speech feature;
   calculating a similarity between the speech feature of the utterance data included in the set and each of a plurality of speaker models; and
   identifying a speaker for each set based on the calculated similarity, wherein
   the identifying includes (1) identifying the speaker in the set having a weighted sum of the similarities equal to or larger than a first threshold as a known speaker corresponding to one of the speaker models, and (2) the identifier identifies the speaker in the set having a weighted sum of the similarities smaller than a second threshold, the second threshold being less than the first threshold, as a new speaker, and
   the speech processing method further comprises generating a new speaker model in the set having the weighted sum of the similarities that is smaller than the second threshold for the identified new speaker,
   wherein the classifying classifies the utterance data into clusters based on similarity of the utterance data, and the identifying obtains a weighted sum of similarity between each cluster and each speaker model, and when the weighted sum exceeds the first threshold, the respective cluster is identified as the known speaker for a corresponding speaker model, and when multiple clusters are identified as a same known speaker, the multiple clusters are integrated for the same known speaker.

8. A computer program product comprising a non-transitory computer-readable medium containing a program, the program causing a computer to execute:
   extracting a speech feature from utterance data;
   classifying the utterance data into a set of utterances for each speaker based on the extracted speech feature;
   calculating a similarity between the speech feature of the utterance data included in the set and each of a plurality of speaker models; and
   identifying a speaker for each set based on the calculated similarity, wherein
   the identifying includes (1) identifying the speaker in the set having a weighted sum of the similarities equal to or larger than a first threshold as a known speaker corresponding to one of the speaker models, and (2) the identifier identifies the speaker in the set having a weighted sum of the similarities smaller than a second threshold, the second threshold being less than the first threshold, as a new speaker, and
   the program causes the computer to further execute:
   generating a new speaker model in the set having the weighted sum of the similarities that is smaller than the second threshold for the identified new speaker,
   wherein the classifier classifying the utterance data into clusters based on similarity of the utterance data, and the identifying obtains a weighted sum of similarity between each cluster and each speaker model, and when the weighted sum exceeds the first threshold, the respective cluster is identified as the known speaker for a corresponding speaker model, and when multiple clusters are identified as a same known speaker, the multiple clusters are integrated for the same known speaker.

9. The speech processing device according to claim 1, wherein the classifier classifies the utterance data into the set of utterances for each speaker such that a distance between speech features of utterances in each set is within a predetermined distance.

* * * * *